(12) United States Patent
Schroeder et al.

(10) Patent No.: US 7,210,360 B2
(45) Date of Patent: May 1, 2007

(54) APPARATUS FOR SENSING POSITION AND/OR TORQUE

(75) Inventors: Thaddeus Schroeder, Rochester Hills, MI (US); Shaotang Chen, Troy, MI (US); Avoki M Omekanda, Rochester, MI (US); Thomas W Nehl, Shelby Township, MI (US); Bruno Lequesne, Troy, MI (US); Mohammad S Islam, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 107 days.

(21) Appl. No.: 10/864,231

(22) Filed: Jun. 9, 2004

(65) Prior Publication Data

US 2004/0250632 A1 Dec. 16, 2004

Related U.S. Application Data

(60) Provisional application No. 60/478,874, filed on Jun. 16, 2003.

(51) Int. Cl.
*G01L 3/02* (2006.01)

(52) U.S. Cl. .................................. 73/862.332

(58) Field of Classification Search ........... 73/862.332, 73/862.331–333, 862.334, 862.329, 862.328
See application file for complete search history.

(56) References Cited

U.S. PATENT DOCUMENTS

| 4,119,911 | A | * | 10/1978 | Johnson, Jr. | 324/207.21 |
|---|---|---|---|---|---|
| 4,784,002 | A | * | 11/1988 | Io | 73/862.331 |
| 4,891,567 | A | * | 1/1990 | Fujitani et al. | 318/254 |
| 5,208,503 | A | * | 5/1993 | Hisey | 310/259 |
| 5,490,431 | A | * | 2/1996 | O'Mahony et al. | 73/862.331 |
| 5,731,529 | A | * | 3/1998 | Nicot | 73/862.326 |
| 6,209,688 | B1 | * | 4/2001 | Kuwahara | 188/156 |
| 6,456,090 | B1 | * | 9/2002 | Ishikawa et al. | 324/546 |
| 6,644,134 | B2 | * | 11/2003 | Laidlaw et al. | 73/862.331 |
| 6,672,175 | B2 | * | 1/2004 | Jin et al. | 73/862.326 |
| 6,707,182 | B2 | * | 3/2004 | Yamanaka et al. | 310/67 R |
| 6,851,325 | B2 | * | 2/2005 | Mir et al. | 73/862.335 |
| 2003/0233889 | A1 | * | 12/2003 | Nakane et al. | 73/862.331 |
| 2005/0172727 | A1 | * | 8/2005 | Pattok et al. | 73/799 |

FOREIGN PATENT DOCUMENTS

FR 2689633 A1 * 10/1993

* cited by examiner

*Primary Examiner*—Max Noori
(74) *Attorney, Agent, or Firm*—Michael D. Smith (57) ABSTRACT

An apparatus measures relative displacement between a first end and a second end of a shaft. The first and second ends being centered on a shaft axis. The apparatus includes first and second ferromagnetic plates. The first ferromagnetic plate has a first side and a second side and is connected to the first end. The first ferromagnetic plate is centered on the shaft axis and has a plurality of ferromagnetic teeth extending from the first side and in a first direction parallel to the shaft. The second ferromagnetic plate has a first side and a second side and is connected to the second end. The second ferromagnetic plate is centered on the shaft axis. The first and second ferromagnetic plates form a gap. The apparatus further includes a plurality of magnets having a magnetic field and a sensing device. The magnets are coupled to the first side of the second ferromagnetic plate. The sensing device is disposed within the gap for sensing a magnetic flux of the magnetic field.

22 Claims, 9 Drawing Sheets

8 POLE GEOMETRY

APPARATUS FOR SENSING POSITION AND/OR TORQUE

This application claims priority to U.S. Provisional Patent Application Ser. No. 60/478,874 filed Jun. 16, 2003.

FIELD OF THE INVENTION

The present invention relates generally to apparatus for sensing position and/or torque and more particularly to an apparatus for sensing position and/or torque between first and second rotating shafts.

BACKGROUND OF THE INVENTION

It is frequently important to measure or sense an angular displacement and/or relative torque between first and second shafts. The relative displacement may be measured by a small angle displacement sensor. The relative position may then be used to derive the torque applied between the two shafts.

For example, power steering systems in motor vehicles and the like are designed to provide appropriate hydraulic or electrical assist to allow a driver to complete a turn of the motor vehicle. The driver typically turns a steering wheel which is connected to a first shaft. The first shaft is coupled to a second shaft which is connected to a steering mechanism. The first and second shafts may be coupled by a compliant member, such as a torsion bar. Typically, the first shaft may rotate with respect to the second shaft by a predetermined number of degrees, e.g., +/−12 degrees. Mechanical stops may prevent further movement. The amount of assist is determined as a function of the amount of torque being applied to the first shaft.

One common sensor to detect position and/or torque uses a potentiometer-based approach. Two stiff disks, each carrying a resistive film trace on a surface are rigidly attached to the torsion bar, one at each end. The twist on the torsion bar resulting from torque being applied to the shaft is translated into an angular displacement between the two disks and reads as resistance value by means of spring loaded contacts sliding on the resistive traces.

Other types of torque sensors utilize one or more magnets for generating a magnetic field. The magnetic circuit typically includes a second magnetic structure which forms a gap. A sensing device, disposed within the gap, detects changes in the magnetic flux which is used as an indication of the relative displacement between the first and second shafts.

One such system is disclosed in US Patent Application 20040011138, published Jan. 22, 2004 (hereafter "Gandel"). The second magnetic structure in Gandel is made up of two ferromagnetic rings, each having a plurality of axially oriented teeth. Each ring includes a circular flux-closing zone, which is parallel to the flux-closing zone of the other ring. The teeth of the rings are generally perpendicular to the flux-closing zones and are interleaved.

One inherent problem with the Gandel device is that it is sensitive to mechanical misalignment during assembly. Specifically, the axial teeth of the rings require very accurate placement with respect to each other. A deviation in the relative position of the rings and teeth with respect to each other will cause reduced performance of the device. It is difficult to accurately align the teeth of the rings and to maintain their relative position to maintain the correct distance from tooth to tooth.

Another disadvantage of the Gandel device is that it is sensitive to mechanical variation during operation. The device is sensitive to angular and parallel changes in the relationship of the two rotors to one another. Mechanical variation in these two directions will cause variation in the output.

Another disadvantage of the Gandel device is an output variation over 360°. This variation is caused by the magnetic structure of the device and the measurement location of the magnetosensitive elements.

Another inherent problem with the rings of the Gandel device, and other sensors of this nature, is that they are complex and difficult and costly to manufacture.

The present invention is aimed at one or more of the problems identified above.

SUMMARY OF THE INVENTION

In one aspect of the invention, an apparatus for measuring relative displacement between a first end and a second end of a shaft, is provided. The first and second ends being centered on a shaft axis. The apparatus includes first and second ferromagnetic plates. The first ferromagnetic plate has a first side and a second side and is connected to the first end. The first ferromagnetic plate is centered on the shaft axis and has a plurality of ferromagnetic teeth extending from the first side and in a first direction parallel to the shaft. The second ferromagnetic plate has a first side and a second side and is connected to the second end. The second ferromagnetic plate is centered on the shaft axis. The first and second ferromagnetic plates form a gap. The apparatus further includes a plurality of magnets having a magnetic field and a sensing device. The magnets are coupled to the first side of the second ferromagnetic plate. The sensing device is disposed within the gap for sensing a magnetic flux of the magnetic field.

In another aspect of the invention, an apparatus for measuring relative displacement between a first end and a second end of a shaft, is provided. The first and second ends being centered on a shaft axis. The apparatus includes first and second ferromagnetic plates. The first ferromagnetic plate has a first side and a second side and is connected to the first end. The first ferromagnetic plate is centered on the shaft axis and has a plurality of ferromagnetic teeth extending from the first side and in a first direction parallel to the shaft. The second ferromagnetic plate has a first side and a second side and is connected to the second end. The second ferromagnetic plate is centered on the shaft axis. The first and second ferromagnetic plates form a gap. The apparatus further includes a plurality of magnets having a magnetic field and a sensing device. The magnets are coupled to the first side of the second ferromagnetic plate. The sensing device is disposed within the gap for sensing a magnetic flux of the magnetic field. The number of magnets is equal to the number of ferromagnetic teeth.

In still another aspect of the invention, an apparatus for measuring relative displacement between a first end and a second end of a shaft, is provided. The first and second ends being centered on a shaft axis. The apparatus includes first and second ferromagnetic plates. The first ferromagnetic plate has a first side and a second side and is connected to the first end. The first ferromagnetic plate is centered on the shaft axis and has a plurality of ferromagnetic teeth extending from the first side and in a first direction parallel to the shaft. The second ferromagnetic plate has a first side and a second side and is connected to the second end. The second ferromagnetic plate is centered on the shaft axis. The first and second ferromagnetic plates form a gap. The apparatus further includes a plurality of magnets having a magnetic field and a sensing device. The magnets are coupled to the first side of the second ferromagnetic plate. The sensing device is disposed within the gap for sensing a magnetic flux of the magnetic field. The number of magnets is equal to twice the number of ferromagnetic teeth.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figures 1, 2A, 2B:
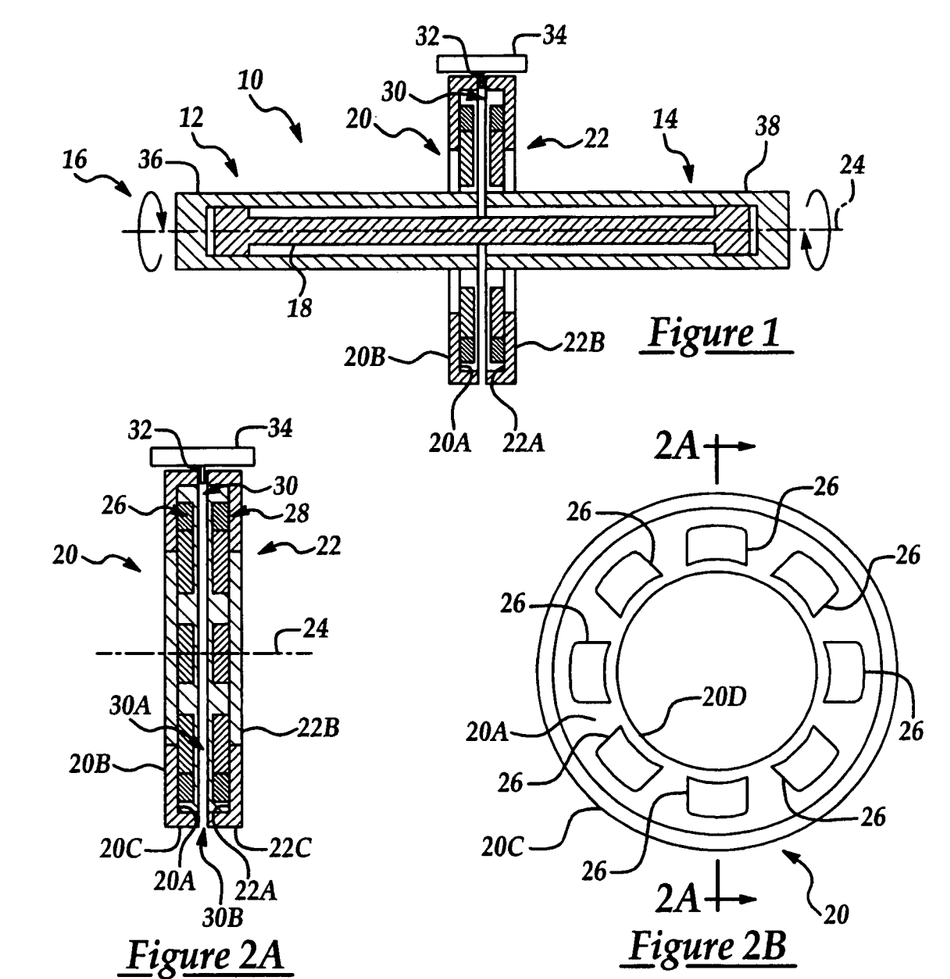
FIG. 1 is an illustration of an apparatus having first and second ferromagnetic plates for sensing a relative position between a first shaft and a second shaft, according to an embodiment of the present invention.
FIG. 2A is an illustration of the first and second ferromagnetic plates of FIG. 1, according to a first embodiment of the present invention.
FIG. 2B is an illustration of the first ferromagnetic plate of FIG. 2A having a plurality of ferromagnetic teeth.

With reference to the FIG. 1 and in operation, an apparatus, or non-contacting, sensor 10 senses the relative position between a first end 12 and a second end 14 of a shaft 16. The relative position may then be used to derive the torque applied between the first and second ends 12, 14.

In the illustrated embodiment, the apparatus 10 may be used in an power steering system (not shown) to provide a measurement of input torque generated by a driver turning a steering wheel (not shown). The input torque is used to provide appropriate hydraulic or electrical assist to allow a driver to complete a turn with minimal effort, but increased stability. The first end 12 is connected to the steering wheel. The second end 14 is coupled to a steering system (not shown), for example, a rack and pinion gear mechanism.

A compliant member such as a torsion bar 18 couples the first and second ends 12, 14. The torsion bar 18 allows relative movement therebetween.

The first and second ends 12, 14 are moveable relative to each other through a predetermined range, e.g., ±8 or ±12 degrees. It should be noted that the range of relative movement will be dependent upon application. The present invention is not limited to any given range of relative movement.

Mechanical stops (not shown) restrict further relative movement between the first and second ends 12, 14. A position sensor may be used to measure rotation of the shaft 16. The position sensor may be a contact or non-contact sensor. The apparatus 10 may be contained within a housing (not), which may also contain portions of the first and second ends of the shafts and components of the power steering system. Such steering systems are well known in the art and are, therefore, not further discussed.

The apparatus 10 includes first and second ferromagnetic plates 20, 22. The first ferromagnetic plate 20 has a first side 20A and a second side 20B and is connected to the first end 12 of the shaft 16. The first ferromagnetic plate 20 being centered on a shaft axis 24 and having a plurality of ferromagnetic teeth 26 extending from the first side 20A and in a first direction parallel to the shaft 16.

The second ferromagnetic plate 22 has a first side 22A and a second side 22B and is connected to the second end 14. The second ferromagnetic plate 22 is centered on the shaft axis 24.

A plurality of magnets 28, having a magnetic field, are coupled to the first side 22A of the second ferromagnetic plate 22. The magnets extend in a second direction (away from the first side 22A of the second ferromagnetic plate 22).

The first and second ferromagnetic plates 20, 22 form a gap 30. The apparatus 10 further includes a first sensing device 32 disposed within the gap 30 for sensing a magnetic flux of the magnetic field. The magnitude of the magnetic flux is proportional to the relevant angular position or deflection, a, between the first and second ends 12, 14 of the shaft 16 (and between the first and second ferromagnetic plates 20, 22), and thus, the torque being applied.

The first sensing device 32, e.g., a hall effect sensor, may be connected to a stationary sensor assembly 34.

In the illustrated embodiment, the first end 12 of the shaft 16 includes a first coaxial extension 36 and the second end 14 of the shaft 16 includes a second coaxial extension 38. Each of the first and second coaxial extensions 36, 38 form an interior bore 36A, 38A and an open end 36B, 38B. The open end 36B, 38B of each of the first and second coaxial extensions 36, 38 face one another. The compliant member 18 is located within the interior bores 36A, 38A. The first ferromagnetic plate 20 has a circular cross-section and a flange 20C extending from an outer edge of the first ferromagnetic plate 20 in the first direction. The second ferromagnetic plate 22 has a circular cross-section and a flange 22C extending from an outer edge of the second ferromagnetic plate 20 in the second direction.

In one embodiment, the first and second ferromagnetic plates 20, 22 are made from a ferromagnetic material. The first and second ferromagnetic plates 20, 22 may be made using a stamping process or a metal injection molding process or a casting process. Alternatively, the first and second ferromagnetic plates 20, 22 are may be made from a powdered metal using a sintering or bonding process.

Figure 4A:
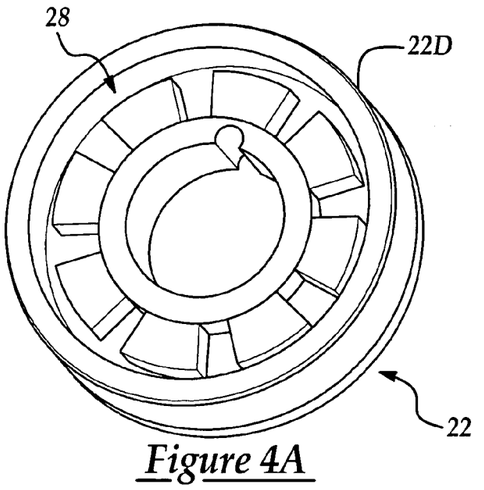
FIG. 4A is an isometric illustration of a second ferromagnetic plate with a base and a layer of ferromagnetic material, according to an embodiment of the present invention.
Figure 4B:
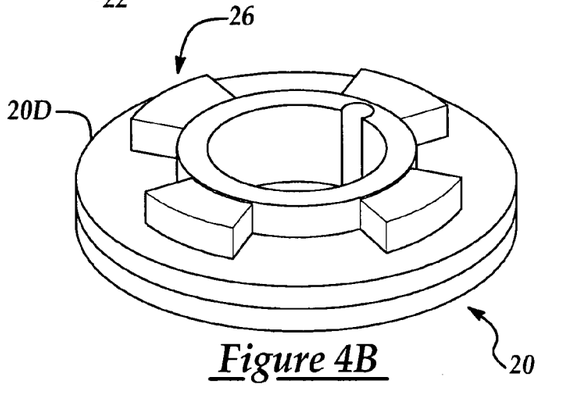
FIG. 4B is an isometric illustration of a first ferromagnetic plate with a base and a layer of ferromagnetic material, according to an embodiment of the present invention.

In another embodiment as shown in FIGS. 4A and 4B, the first and second ferromagnetic plates 20, 22 are made from a non-ferromagnetic material. A ferromagnetic layer 20D, 22D is disposed on the first side 20A, 20B of each of the first and second ferromagnetic plates 20, 22.

When used in a steering system, the torsion bar 18 rotates with the steering wheel. When no torque is being applied, the ferromagnetic teeth 26 are positioned between two adjacent magnets 28, so that the flux is balanced. When a torque is applied, the ferromagnetic teeth 28 become displaced with respect to the magnets by some angular distance ($\alpha$) proportional to torque. Since the torsion bar 18 rotates with the steering wheel, both the first and second ferromagnetic plates 20, 22 must rotate with the steering wheel, by up to several revolutions. The first sensing device 32, therefore senses the relative angular displacement between the first and second ferromagnetic plates 20, 22.

With particular reference to FIGS. 2A–2G, in one embodiment the magnets are magnetized with the same polarity in a direction normal to the first side 22A of the second ferromagnetic plate 22. In other words, either the North pole or the South pole of each magnet 28 is facing the first ferromagnetic plate 20. The number of teeth 26 (K) is the same as the number of magnets 28. An exemplary value of K is nine, although, the present invention is not limited to any K value.

Figure 2C:
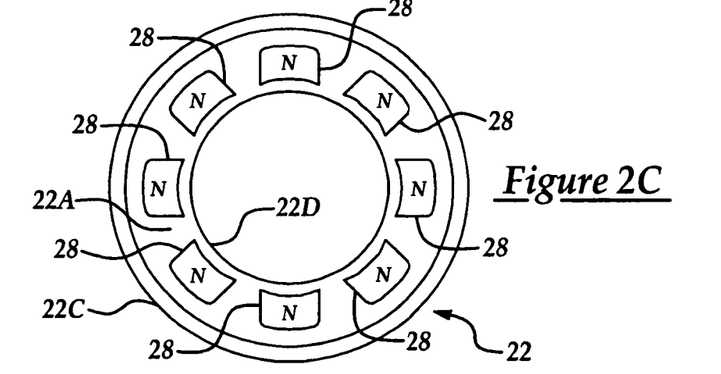
FIG. 2C is an illustration of the second ferromagnetic plate of FIG. 2A having a plurality of magnets attached thereto.
Figure 2D:
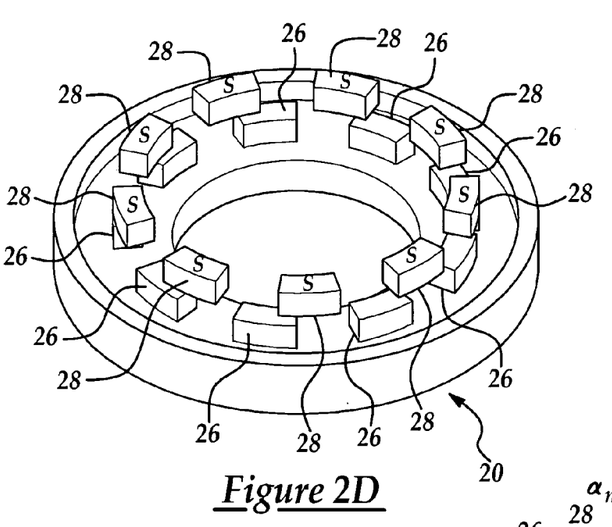
FIG. 2D is an isometric drawing of the first ferromagnetic plate and the magnets of FIG. 2A.
Figure 2E:
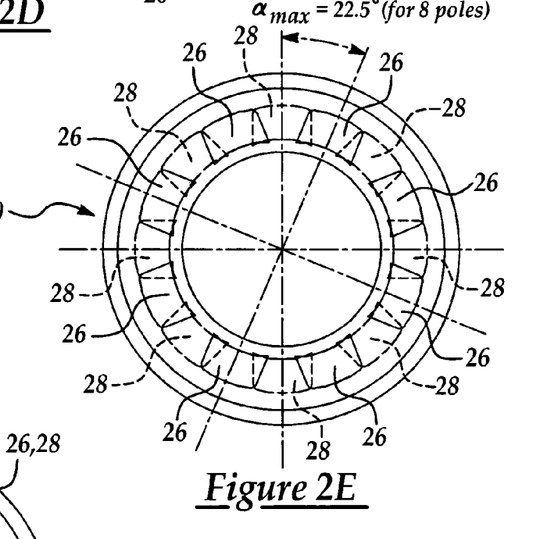
FIG. 2E is an illustration showing a maximum angular displacement between the ferromagnetic teeth and the magnets, according to an embodiment of the present invention.

As shown, the first and second ferromagnetic plates 20, 22 include an interior bore 20D, 22D for mounting to the first and second coaxial extensions 36, 38, respectively.

In one embodiment, the shape and dimensions of the ferromagnetic teeth 26 and the magnets 28 are substantially identical. In another embodiment, the shape and dimensions of the ferromagnetic teeth 26 and the magnets 28 are not identical.

The apparatus 10 operates as follows. The first and second ferromagnetic plates 20, 22, teeth 26 and magnets 28 form a magnetic circuit. The magnetic flux generated by the magnets 28 crosses through the gap 30 from the magnets 28 into the ferromagnetic teeth 26 at a first portion 30A of gap 30. The first portion 30A of gap 30 is that part of the airgap directly between magnets 28 and teeth 26. The flux then travels through the first ferromagnetic plate 20 towards the outer rim of the first ferromagnetic plate 20. The magnetic flux crosses back through the gap 30 at a second portion 30B of gap 30 back to the magnets 28, thereby closing the magnetic circuit. The second portion 30B of gap 30 is that part of the airgap between the outer rims of ferromagnetic plates 20 and 22. The magnitude of the magnetic flux density depends on the total reluctance of the magnetic circuit. The first sensing device 32 is located within portion 30B of the gap 30, and senses the flux density therein. The lengths of portions 30A and 30B of air gap 30 may be of different sizes. For instance, portion 30B may be larger in order to physically accommodate the Hall sensors. At the same time, if portion 30A does not have such a physical limitation, it may be shorter in order to increase the average flux density in the magnetic circuit.

Application of torque to the shaft 16 causes a proportional twist of the torsion bar 18. The resultant relative angular displacement of the first and second ends 12, 14 is transmitted through the coaxial shaft extensions 36, 38, to the first and second ferromagnetic plates 20, 22. This changes the alignment between the magnets 28 and the ferromagnetic teeth 26, and thus, the reluctance of the magnetic circuit.

Figure 2F:
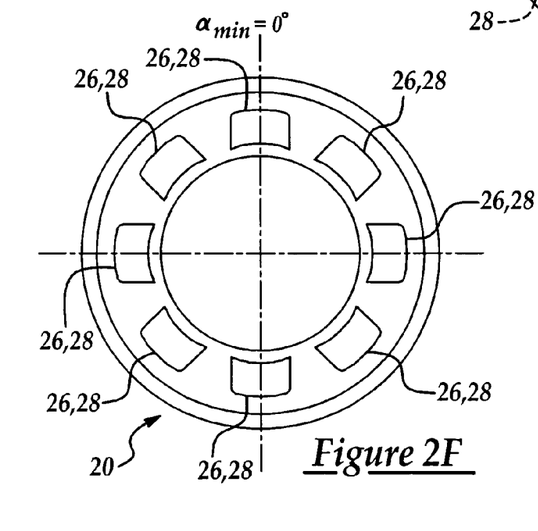
FIG. 2F is an illustration showing a minimum angular displacement between the ferromagnetic teeth and the magnets, according to an embodiment of the present invention.

In the illustrated embodiment shown in FIGS. 2A–2F, an eight pole apparatus is shown. The first ferromagnetic plate 20 has eight teeth. The second ferromagnetic plate 22 has eight magnets. With specific reference to FIGS. 2E–2F, the teeth 28 and the magnets 26 are shown in extreme alignment positions, with the teeth totally out of alignment or out-of-phase (FIG. 2E) and with the teeth aligned or in-phase (FIG. 2F).

The full operating range (+/-$\alpha_{max}$ or $\Delta\alpha$) of the torsion bar twist is typically a design parameter. In the illustrated embodiment, a range of +/-8° or a $\Delta\alpha$ of 16° is used. Fundamentally, a single magnet and a single tooth could be used provided the size and shape of the tooth and magnet would yield a linear change of sufficient magnitude over $\Delta\alpha$ (see FIGS. 5A and 5B). However, multiple magnets and teeth will generally strengthen the magnetic signal. For a given $\Delta\alpha$ there is a maximum number of teeth and magnets ($K_{max}$) defined by the equation $K_{max}=180°/\Delta\alpha$. In the above example $\Delta\alpha=16°$. Thus, $K_{max}=180°/16°$ or 11. However, the maximum number of teeth may provide too little margin for attaining good linearity within the whole range torsion bar twist ($\Delta\alpha$) due to strong magnetic nonlinearities when the teeth and magnets are completely in phase or out-phase.

Figure 2G:
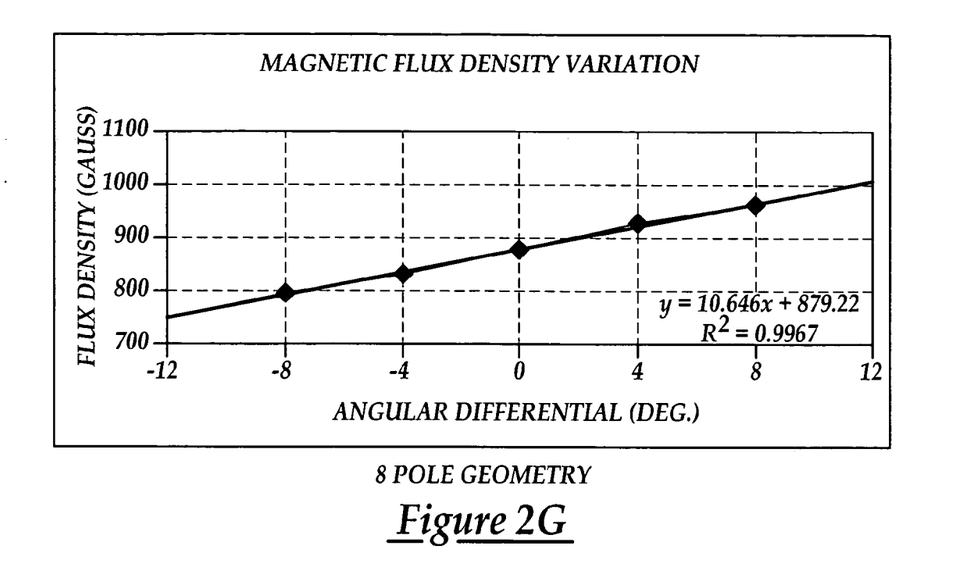
FIG. 2G is a graph illustrating magnetic flux density as a function of angular displacement, according to the first embodiment of the present invention.

It has been found that in this geometry 8 or 9 teeth/magnets results in excellent linearity in the whole operating range of $\Delta\alpha$, i.e., 16°. FIG. 2G is an exemplary graph illustrating this linearity for an eight pole geometry. Since the flux from the magnets 28 travels through portions 30A and 30B of airgap 30 to form a single magnetic circuit, the flux density in sensor 32, as plotted in FIG. 2G, is always either positive or negative, and of substantial value (non-zero). That is, it goes from some positive (or negative), minimum value (for instance about +800 G in the example shown in FIG. 2G at position −8 degrees) to some positive (or negative), maximum value (for instance about +960 G in the example shown in FIG. 2G at position +8 degrees). The value of flux density at position 0 degrees is not zero.

With particular reference to FIGS. 3A–3E, in another embodiment the magnets 28 are magnetized with alternating polarity in a direction normal to the first side 22A of the second ferromagnetic plate 22. In other words, one magnet 28 has a North pole facing the first ferromagnetic plate 20 and the adjacent magnets 28 have a South pole facing the first ferromagnetic plate 20 (see FIG. 3C). Additionally, the number of teeth 26, K, is half the number of magnets 28. Exemplary values of K include eight, nine, or eleven, although, the present invention is not limited to any K value.

Figure 3A:
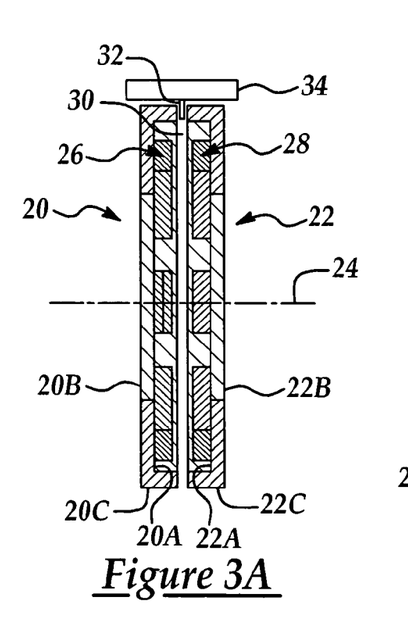
FIG. 3A is an illustration of the first and second ferromagnetic plates of FIG. 1, according to a second embodiment of the present invention.
Figure 3B:
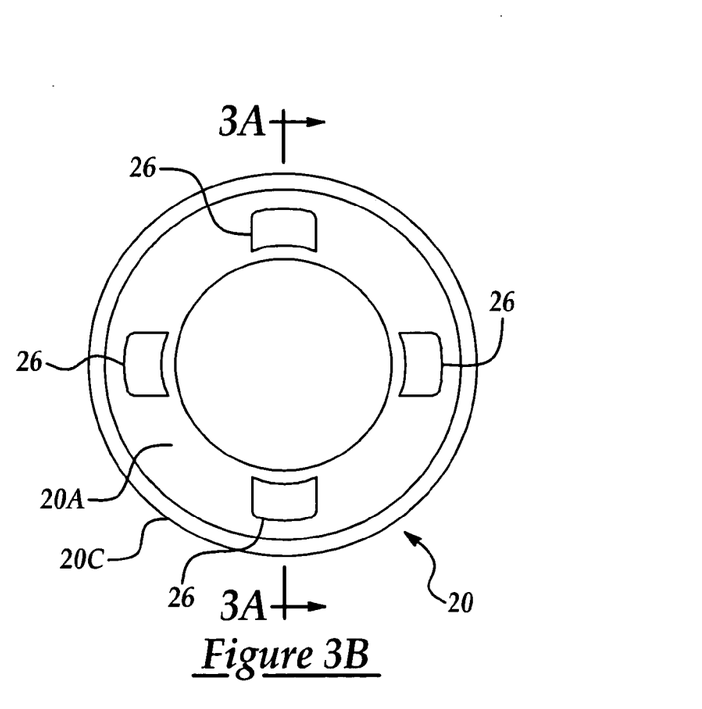
FIG. 3B is an illustration of the first ferromagnetic plate of FIG. 3A having a plurality of ferromagnetic teeth.

In one embodiment, the shape and dimensions of the ferromagnetic teeth 26 and the magnets 28 are substantially identical. In another embodiment, the shape and dimensions of the ferromagnetic teeth 26 and the magnets 28 are not identical.

The apparatus 10 operates as follows in a similar manner as the embodiment disclosed above. The first and second ferromagnetic plates 20,22, teeth 26 and magnets 28 form a magnetic circuit. The magnetic flux generated by the magnets 28 crosses through the gap 30 from the magnets 28 into the ferromagnetic teeth 26 at location 30A. Due to the alternating polarities of the magnet magnetizations in this embodiment, most of the flux actually remains within the magnets, portion 30A of gap 30, and teeth 26. In fact, if the teeth 26 are exactly in-between two adjacent magnets, then all of the flux is limited to that magnetic circuit. However, if the teeth are not centered between two adjacent magnets, then some of the flux from magnets 28 travels through the first ferromagnetic plate 20 towards the outer rim of the first ferromagnetic plate 20. This smaller portion of the magnetic flux crosses back through the gap 30 at location 30B back to the magnets 28. In this embodiment, therefore, the gaps 30A and 30B constitute two closed, parallel magnetic circuits. The magnitude of the magnetic flux density depends on the total reluctance of these two magnetic circuits. The first sensing device 32 is located within portion 30B of the gap 30, and senses the flux density therein.

Application of torque to the shaft 16 causes a proportional twist of the torsion bar 18. The resultant relative angular displacement of the first and second ends 12, 14 is transmitted through the coaxial shaft extensions 36, 38, to the first and second ferromagnetic plates 20, 22. This changes the alignment between the magnets 28 and the ferromagnetic teeth 26, and thus, the reluctance of the magnetic circuit.

Figures 3C, 3D:
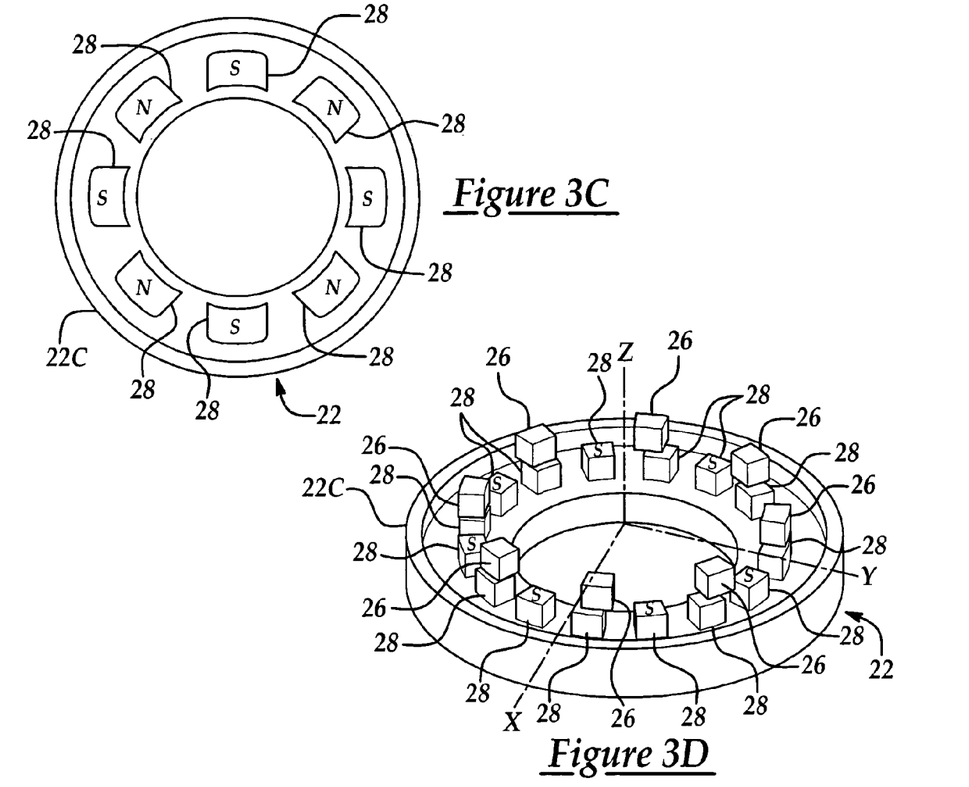
FIG. 3C is an illustration of the second ferromagnetic plate of FIG. 3A having a plurality of magnets attached thereto.
FIG. 3D is an isometric drawing of the second ferromagnetic plate and the ferromagnetic teeth of FIG. 3A.

In the illustrated embodiment shown in FIGS. 3A–2E, an four/eight pole apparatus is shown. The first ferromagnetic plate 20 has four teeth 26. The second ferromagnetic plate 22 has eight magnets 28. An embodiment with eight teeth 26 and 16 magnets is shown in FIG. 3D.

The full operating range ($+/-\alpha_{max}$ or $\Delta\alpha$) of the torsion bar twist is typically a design parameter. In the illustrated embodiment, a range of $+/-8°$ or a $\Delta\alpha$ of $16°$ is used. Fundamentally, two magnets and a single tooth could be used provided the size and shape of the tooth and magnet would yield a linear change of sufficient magnitude over $\Delta\alpha$. However, multiple magnets and teeth will generally strengthen the magnetic signal. For a given $\Delta\alpha$ there is a maximum number of teeth ($K_{max}$) and magnets ($2\times K_{max}$) defined by the equation $K_{max}=180°/\Delta\alpha$. In the above example $\Delta\alpha=16°$. Thus, $K_{max}=180°/16°$ or 11 teeth (22 magnets). However, the maximum number of teeth may provide too little margin for attaining good linearity within the whole range torsion bar twist ($\Delta\alpha$) due to strong magnetic nonlinearities when the teeth and magnets are completely in phase or out-of-phase.

Figure 3E:
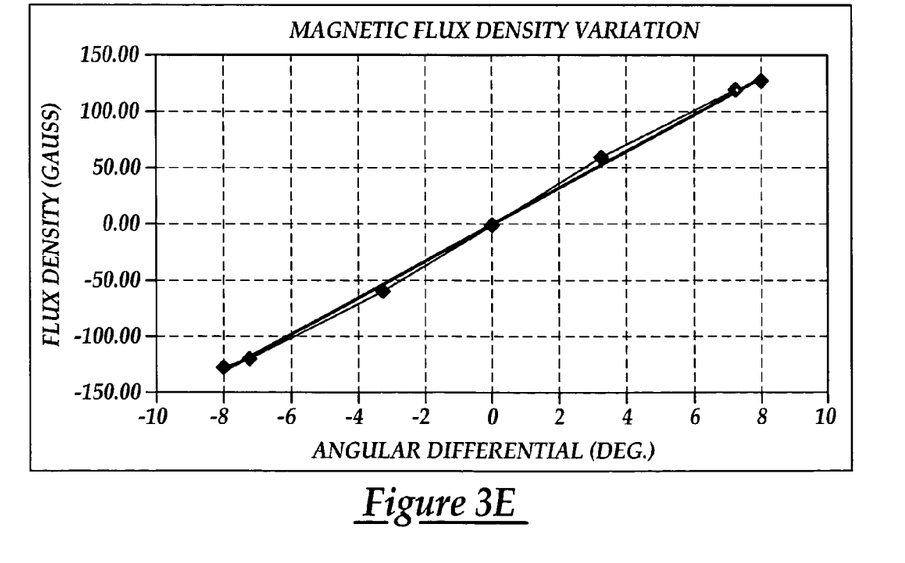
FIG. 3E is a graph illustrating magnetic flux density as a function of angular displacement, according to the second embodiment of the present invention.

It has been found that in this geometry, sets of 4 teeth and 8 magnets result in excellent linearity in the whole operating range of $\Delta\alpha$, i.e., $16°$. FIG. 3E illustrates is an exemplary graph illustrating this linearity for four/eight pole geometry. An inspection of FIG. 3E in addition reveals that the flux density is now an odd function of position. In particular, the flux density is zero when at position zero degrees. The value of flux density at position +8 degrees is minus the value at position −8 degrees, (respectively about +130 G and −130 G in this example). Moreover, the flux in portion 30B of the gap 30, and therefore in sensor 32, is here only a portion of the total flux from the magnets 28. As a result, the flux density in sensor 32 is always of a relatively small magnitude: 130 G, in the example of FIG. 3E, is smaller than the minimum 800 G observed in FIG. 2G, for instance.

Figure 5A:
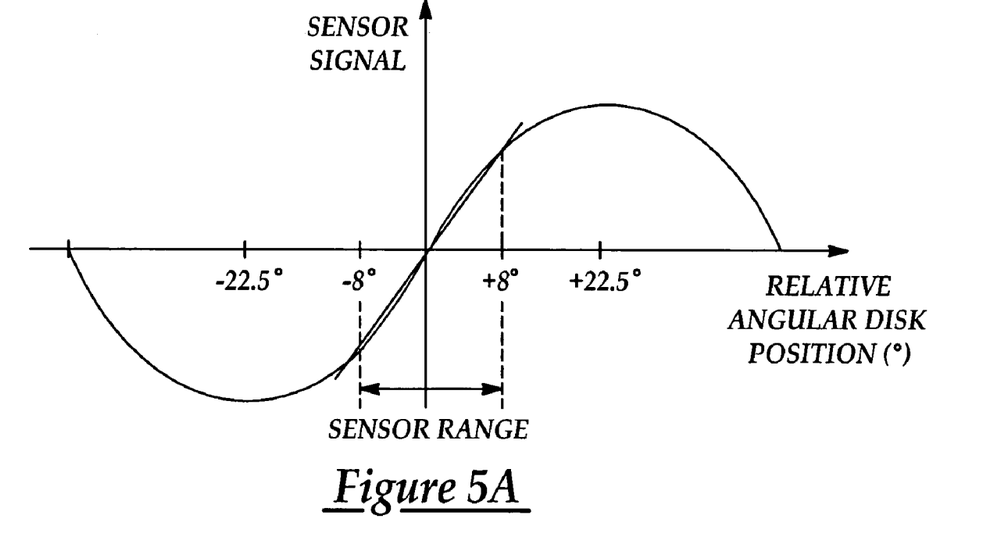
FIG. 5A is a graph illustrating a range of operation of the present invention, according to one embodiment.
Figure 5B:
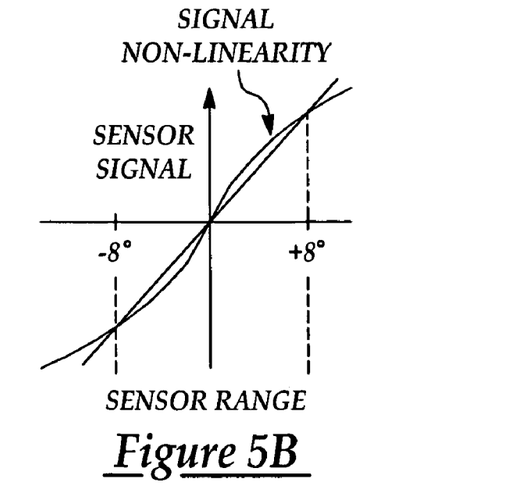
FIG. 5B is an is an enlarged portion of the graph of FIG. 5A.

As discussed above, it is desirable for the output signal of the sensing device 32 to be as linear as possible over $\Delta\alpha$. If one of the first or second ferromagnetic plates 20, 22 was rotated freely with respect to the other, the output signal of the first sensing device 32 would be periodic. If 4 teeth and 8 magnets are used, the period is $90°$, as shown in FIG. 5A. The portion of the curve shown in FIG. 5B is the portion over $\Delta\alpha(+/-8°$ in the given example). This can be achieved via the respective sizes of the teeth 26 and magnets 28.

FIGS. 6A–6E present a cross-section of the apparatus 10 along a partial circumference that includes magnets 28 and teeth 26 and portion 30A of airgap 30 in-between. It should be noted that while FIGS. 6A–6E are related to an embodiment of the apparatus 10 that has K teeth and 2K magnets, the features discussed below are applicable to an apparatus that has K teeth and K magnets (see above).

The ferromagnetic teeth have a width, $W_t$, and the magnets have a width, $W_{PM}$. $W_t$ and $W_{PM}$ may be expressed as angular arcs. In one embodiment, the sides of the teeth are parallel, i.e., $W_t$ is constant from an inner radius to an outer radius. In another embodiment, $W_t$ and $W_{PM}$ are averages between an inner radius and an outer radius of the teeth 26 and the magnets 28, respectively.

As shown, the first ferromagnetic plate 20 is composed of the teeth 26 and slots 40. Tooth height is designated as $H_t$.

The second ferromagnetic plate 22 includes a plurality of magnet assembly poles 42 on which the magnets 28 are set. The assembly poles have a height designated by $H_{sub\ PM}$. Magnet height is designated as $H_{PM}$. The direction of the magnet magnetizations is represented by arrows. Adjacent poles 42 are separated by PM slots 44. "PM Pole Pitch" or $\theta_{PM\ Pitch}$ denotes the sum of the magnet width ($W_{PM}$) and the width of the PM slots 44. A magnet pole thus includes one magnet pole (either north or south) and a PM slot 44. The combination of one north and one south pole constitutes a pole pair. The geometric period of the apparatus 10, i.e., the distance between the centerlines of two north-pole (or south-pole) magnets, thus encompasses an entire pole pair.

Figure 6A:
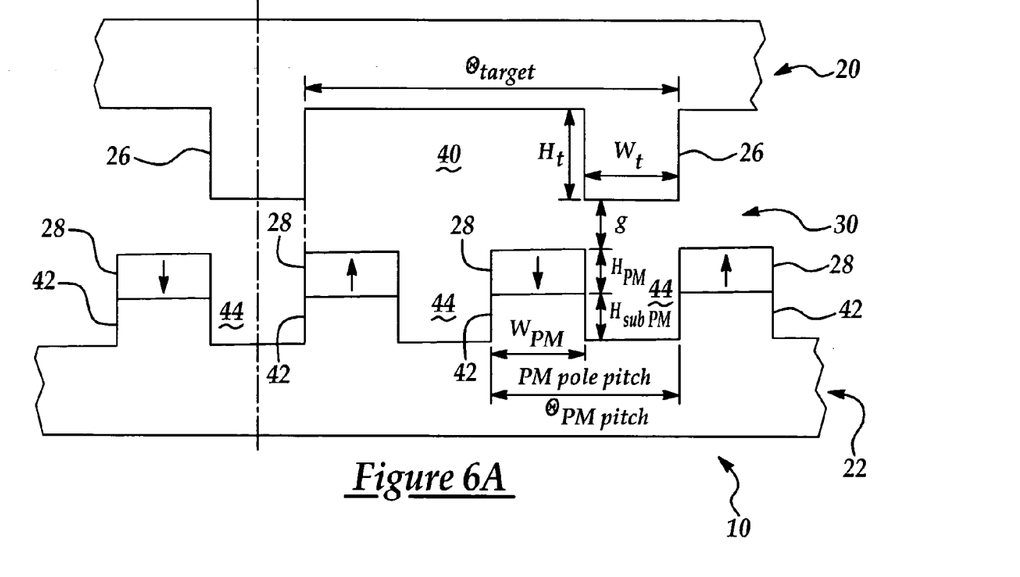
FIG. 6A is a diagrammatic illustration of the relationship between the ferromagnetic teeth and the magnets at zero degrees deflection, according to an embodiment of the present invention.
Figure 6B:
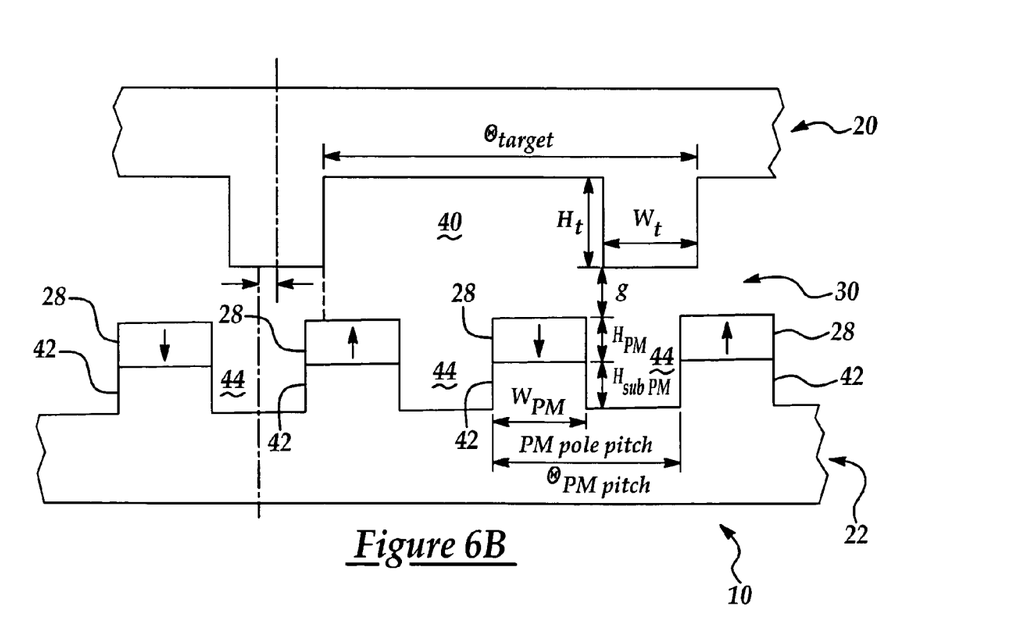
FIG. 6B is a diagrammatic illustration of the relationship between the ferromagnetic teeth and the magnets at four degrees deflection, according to an embodiment of the present invention.
Figure 6C:
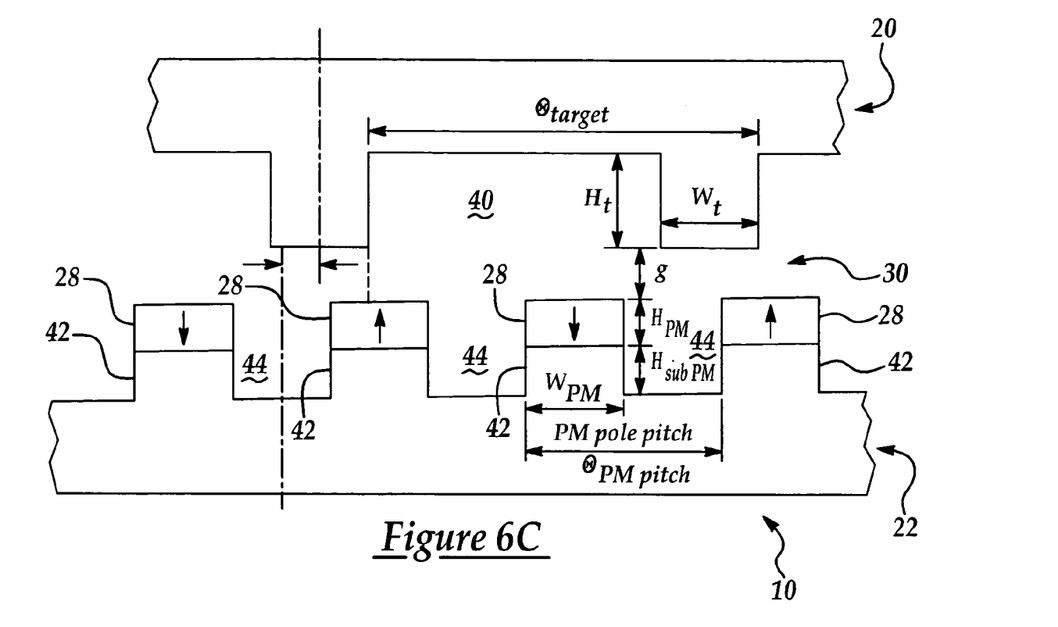
FIG. 6C is a diagrammatic illustration of the relationship between the ferromagnetic teeth and the magnets at eight degrees deflection, according to an embodiment of the present invention.

With specific reference to FIGS. 6A, 6B, and 6C, the tooth width, $W_t$, is equal to $W_{PM}$. Also, with specific reference to FIGS. 6A, 6B, and 6C, $W_t+W_{PM}=\theta_{PM\ Pitch}$. FIGS. 6A, 6B, and 6C illustrate the geometric relationship between the first and second ferromagnetic plates 20, 22 at angular deflections ($\alpha$) of $0°$, $4°$, and $8°$, respectively.

As discussed above, when $\alpha=0°$, no torque is being applied. When torque is applied, the relative angular position begins to deviate and each tooth 26 begins to overlap with a respective magnet 28. This creates a large change in flux resulting in convex and non-linear output.

Figure 6D:
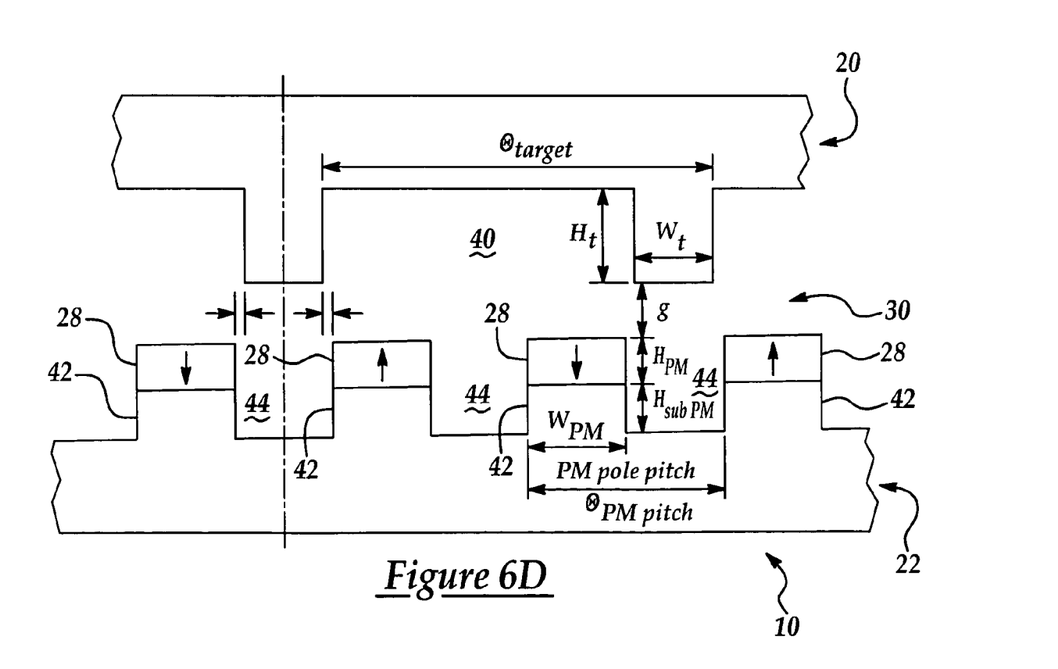
FIG. 6D is a diagrammatic illustration of the relationship between the ferromagnetic teeth and the magnets at zero degrees deflection, according to another embodiment of the present invention.

In one aspect of the present invention, it is desirable to have the flux change more gradually. This can be achieved through the geometry of the teeth 26 and magnets 28. With reference to FIG. 6D, in one embodiment the teeth 26 and the magnets 28 are sized such that there is no overlap, i.e., there is a gap, at $\alpha=0°$. In other words, $$W_t + W_{PM} < \theta_{PM\ Pitch}.$$

In the illustrated embodiment, $W_t$ is equal to the width of the PM slots 44 minus $W_{min}$. As shown, when $\alpha=0°$ each tooth 26 is centered between two adjacent magnets 28, thus there is a gap between each side of the tooth 26 and the sides of the adjacent magnets 28 equal to $\frac{1}{2}$ $W_{min}$.

Figure 6E:
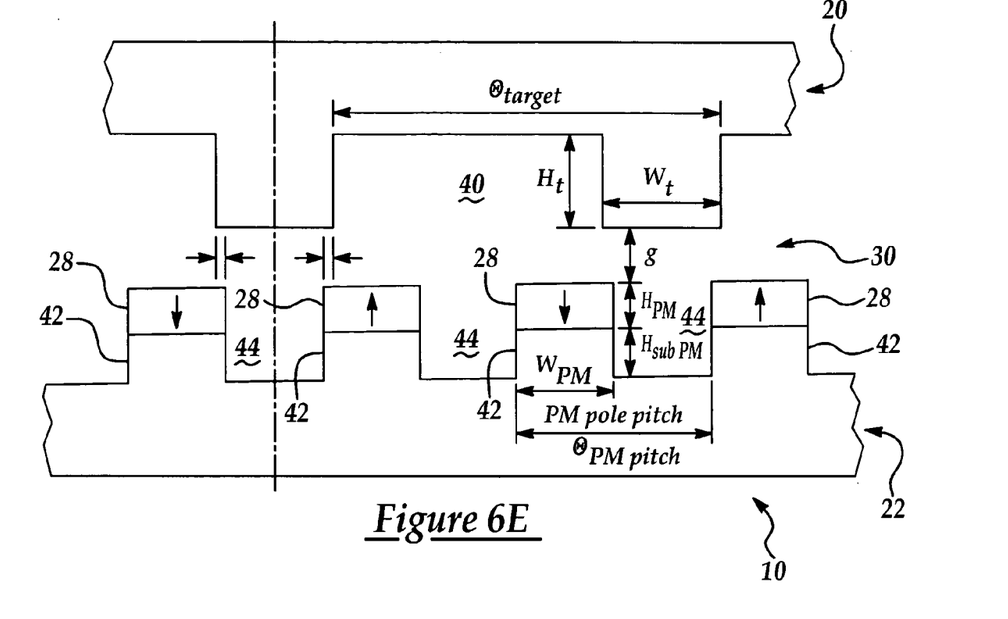
FIG. 6E is a diagrammatic illustration of the relationship between the ferromagnetic teeth and the magnets at zero degrees deflection, according to still another embodiment of the present invention.

With reference to FIG. 6E, in one embodiment the teeth 26 and the magnets 28 are sized such that there exists an overlap between the teeth 26 and the magnets 28 at $\alpha=0°$. In other words, $$W_t + W_{PM} > \theta_{PM\ Pitch}.$$

In the illustrated embodiment, $W_t$ is equal to the width of the PM slots 44 plus $W_{min}$. As shown, when $\alpha=0°$ each tooth 26 is centered between two adjacent magnets 28, thus there is an overlap gap between each tooth 26 and adjacent magnets 28 equal to $\frac{1}{2}$ $W_{min}$.

In one embodiment, $W_{min}$ is greater than 5%, but less than 20%, of $\theta_{PM\ Pitch}$. For example, $W_{min}$ may be equal to 12%. However, these are guidelines only. The magnitude of $W_{min}$ may vary depending on various parameters, including overall diameter or dimensions of the apparatus 10, and materials. Generally, for any particular set of dimensions, materials, etc. . . . , there will be a set of magnet and tooth dimensions that minimizes the non-linearity of the output signal.

One exemplary design would be as follows:

$$W_t = \frac{1}{2} \theta_{PM\ Pitch},$$

$$W_{PM} = W_t - 0.12 \times \theta_{PM\ Pitch}.$$

In calculations based on a design with eight magnets, an average magnet radius of 20 mm, $\theta_{PM\ Pitch} = 45°$, $W_{PM} = 16.8°$, $W_t = 22.5°$, (thus, $W_{min} = 5.7°$ or 12.5% of $\theta_{PM\ Pitch}$), the output signal was calculated to not deviate more than 0.25% from an ideal, linear curve.

Figure 7:
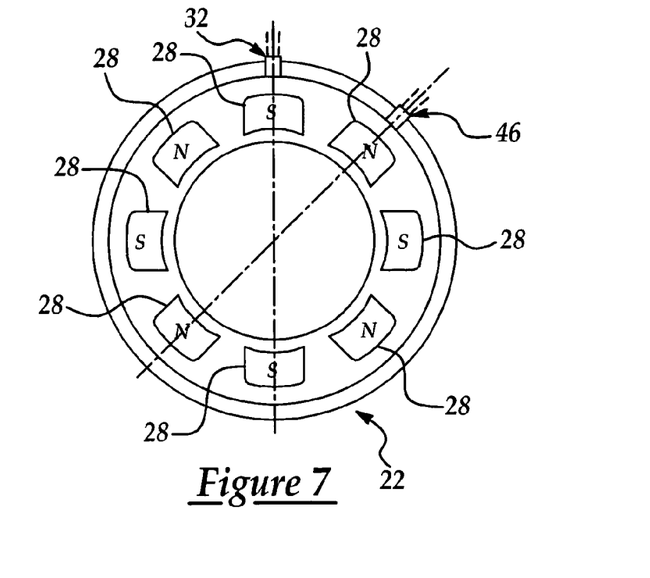
FIG. 7 is an illustration of the second ferromagnetic plate, according to an embodiment of the present invention.

With reference to FIG. 7, in one embodiment the apparatus 10 includes a second sensing device 46, such as a hall effect sensor, disposed within portion 30B of the gap 30. The first and second sensing devices 32, 46 are angularly displaced along the annular airgap 30 for instance redundancy. An average or sum of the two device output signals may be used as a measure of torque. In one embodiment, the spacing between the devices 32, 46 may be defined by $N \cdot \theta_{PM\ Pitch}$, where N is an odd number. As shown, N may equal 1. With this specific spacing $N \cdot \theta_{PM\ Pitch}$, the additional of the second sensing device 46 may will contribute to the elimination of signal variations along the periphery of the annular airgap.

Figure 8:
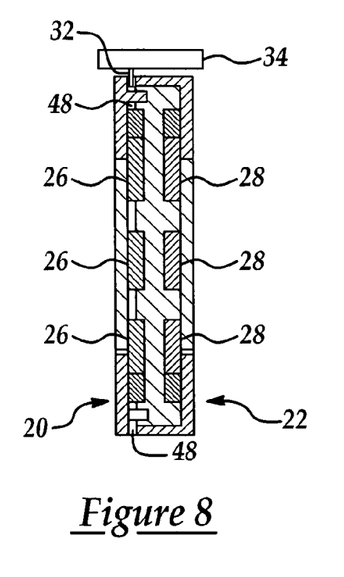
FIG. 8 is an illustration of the first and second ferromagnetic plates, according to an embodiment of the present invention; and, FIG. 9 is a partial illustration of the second ferromagnetic plate, according to an embodiment of the present invention.

In one embodiment, portions 30A and 30B of gap 30, although they may be of different lengths, are essentially co-planar (see FIG. 2A). With reference to FIG. 8, in another embodiment portion 30B where the first sensing device 32 (or the first and second sensing devices 32, 46) are disposed is not in the same plane as portion 30A of the gap 30 between the first and second ferromagnetic plates. Portion 30B is closer to one of the first and second ferromagnetic plates 20, 22. In the illustrated embodiment and preferably, the first sensing device 32 is closer to the first ferromagnetic plate 20, so as to be farther from magnets 28.

The relative position ($\alpha$) between the first and second ferromagnetic plates 20, 22 is determined by the torque on the torsion bar 18 and is independent of steering wheel position. It is important, therefore, that the flux in the gap 30 that is measured by the sensing devices 32, 46 is also independent of steering wheel position. There are two factors that influence the magnitude of the flux density ripple along the circular path swept by the sensing devices 32, 46 as the steering shaft rotates. These are:

i. First factor: Magnetic flux leaks from the magnet faces into the air gap region where the Hall sensor is located (see arrow on FIG. 9). This produces a flux ripple component that alternately adds to, then subtracts from, the dc flux density (torque) level. It is important that the sensor be isolated magnetically from this magnet leakage flux to reduce this variation.

ii. Second factor: The finite permeability of the iron core means that the flux will not be uniform with respect to angle along the circular path swept by the sensor. Increasing the iron core's permeability improves the degree of flux spreading thus improving rotational accuracy. Hence, for a given sensor geometry, the iron core must have a certain minimum permeability before this effect becomes negligible.

It must be noted that, when permeability is mentioned, a distinction will be made between initial, maximum, or other permeability. Regardless of the material, the slope is relatively low at first; this is called the initial permeability. The slope then increases after a first inflexion point, then reaches a maximum before saturation.

The first factor can be handled by offsetting portion 30B of the air gap 30 in which the sensing devices 32, 46 is placed (see above). Offsetting this portion 30B to the first ferromagnetic plate side with the ferromagnetic teeth 26 maximizes the distance between the sensing devices 32, 46 and the magnets 28 thus minimizing variation of the sensor output with position. This can be further enhanced by means of a ferromagnetic shield 48 (annular ring or partial ring) below portion 30B of the axial air gap in which the sensing devices 32, 46 reside.

The second factor can be addressed by using a sufficiently high permeability. In a specific study, it was found that values of relative permeability in the range of 500 to 3,000 are sufficient Referring first to the first embodiment, the magnetic flux is relatively large, as explained above and shown illustratively in FIG. 2G. What is referred to here is therefore the permeability level at flux density levels on the order of 500 to 1,500 G, which is much beyond the initial permeability. Referring next to the second embodiment, the magnetic flux is small, as shown illustratively in FIG. 3E, and close to zero or even zero at position 0 degrees. What is referred to here as "sufficiently high permeability" is therefore "sufficiently high initial permeability". In a specific study, it was found that values of relative initial permeability in the range of 500 to 3,000 are sufficient. Regardless of embodiment, higher permeabilities, initial or otherwise, would of course be welcome, but may require the use of more expensive materials.

Figure 9:
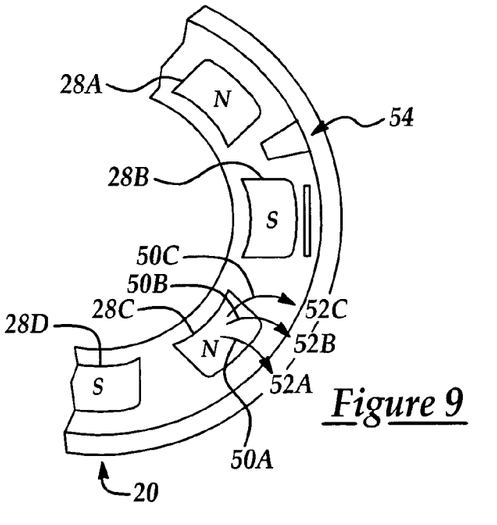

The second factor can be addressed somewhat differently as well. More generally, the issue is one of uneven reluctance of the flux path emanating from the magnets and returning towards the annular ring. With reference to FIG. 9, this issue is illustrated around one of the magnets 28C, while the proposed solution (in two different embodiments) is shown near other magnets 28A, 28B. Of course, the actual implementation of the proposed solution would be repeated periodically around each of the magnets 28; this is simply for convenience of illustration.

With reference to the third magnet 28C, the return flux from the magnets 28 can follow either path 50A, 50B, or 50C (symmetrical paths towards the other magnets are not shown). The reluctance of a magnetic path is given by:

$$R=l/(\mu \cdot s),$$

where l is the length of the path, s its cross section, and $\mu$ the permeability of the material. It is thus clear that the reluctance of path 50A is smaller since its length is shorter than, increasingly, the reluctances of path 50B, then path 50C. Therefore the flux density will be stronger in location 52A than in location 52B, or 52C.

In another embodiment, the reluctances of paths 50A, 50B, 50C are adjusted by adding thickness to the material (indicated by 54), where the path is longer (between the magnets, and towards the outer ring), the reluctance of path 3 is reduced. Conversely, one may increase the reluctance of path 50A by reducing the thickness of the material behind the magnets 28 or removing the material entirely (generally indicated by 56), thus adding a high-reluctance section of path made of air.

Whether this second issue is addressed by using a high material permeability, or adding/removing material, the reluctance paths may be equalized. If the material permeability is sufficiently high, then it makes the reluctances of paths 50A, 50B, 50C so small that the fact that they are different is not important, i.e., the reluctances are equalized by making them all small as compared to airgap and other reluctances.

Generally, the preferred way to address this second issue consists of using a material of sufficient permeability. This is preferred because it is simpler. The other approaches, either adding material between the magnets, or removing material either partially or completely (slit), provide nevertheless a powerful design tool for additional adjustments. Further, if powder metal technology is used to build the first and second ferromagnetic plates 20, 22, the addition or removal of material may be simply a matter of fine-tuning the mold design, thus adding no manufacturing cost in mass production. This can provide an opportunity to use any material even one with a relatively poorer permeability.

Other methods may be used to enhance signal strength. For example, the magnet may be made bigger in terms of height or in terms of inner and outer radii. The magnet width, within the constraints of the relationship presented earlier, may also be increased.

The signal can also be enhanced by using more permeable materials for the return path and teeth 26. Finally, the width of the annular airgap 30 can be made smaller to focus the flux density in the sensing device(s) 32, 46. A trapezoidal shape is one possibility in this respect.

Smaller airgaps also increase the flux density. If the length of the annular airgap is very small, however, it is critical for the two facing surfaces across the airgap to be precisely parallel. Otherwise, there could be some signal variation around the circumference of this airgap.

Obviously, many modifications and variations of the present invention are possible in light of the above teachings. The invention may be practiced otherwise than as specifically described within the scope of the appended claims.

What is claimed is:

1. An apparatus for measuring relative displacement between a first end and a second end of a shaft the first and second ends being centered on a shaft axis, comprising:

a first ferromagnetic plate having a first side and a second side and being connected to the first end, the first ferromagnetic plate being centered on the shaft axis and having a plurality of ferromagnetic teeth extending from the first side and in a first direction parallel to the shaft;

a second ferromagnetic plate having a first side and a second side and being connected to the second end, the second ferromagnetic plate being centered on the shaft axis, the first and second ferromagnetic plates forming a gap;

a plurality of permanent magnets having a magnetic field and being coupled to the first side of the second ferromagnetic plate, the magnets extending in a second direction, the second direction being opposite the first direction;

a first sensing device disposed within the gap for sensing a magnetic flux of the magnetic field; and the first ferromagnetic plate having a circular cross-section and a circumferential flange extending from an outer edge of the first ferromagnetic plate in the first direction and located radially distal from the plurality of ferromagnetic teeth.

2. An apparatus for measuring relative displacement between a first end and a second end of a shaft the first and second ends being centered on a shaft axis, comprising:

a first ferromagnetic plate having a first side and a second side and being connected to the first end, the first ferromagnetic plate being centered on the shaft axis and having a plurality of ferromagnetic teeth extending from the first side and in a first direction parallel to the shaft;

a second ferromagnetic plate having a first side and a second side and being connected to the second end, the second ferromagnetic plate being centered on the shaft axis, the first and second ferromagnetic plates forming a gap;

a plurality of permanent magnets having a magnetic field and being coupled to the first side of the second ferromagnetic plate, the magnets extending in a second direction, the second direction being opposite the first direction;

a compliant member coupled between the first and second ends of the shaft for allowing relative movement therebetween;

the first end of the shaft having a first coaxial extension and the second end of the shaft having a second coaxial extension, each of the first and second coaxial extensions forming an interior bore and an open end, the open end of each of the first and second coaxial extensions facing one another, the compliant member being located within the interior bore;

a first sensing device disposed within the gap for sensing a magnetic flux of the magnetic field; and the second ferromagnetic plate having a circular cross-section and a circumferential flange extending from an outer edge of the second ferromagnetic plate in the second direction and located radially distal from the plurality of ferromagnetic teeth.

3. An apparatus for measuring relative displacement between a first end and a second end of a shaft the first and second ends being centered on a shaft axis, comprising:
- a first ferromagnetic plate having a first side and a second side and being connected to the first end, the first ferromagnetic plate being centered on the shaft axis and having a plurality of ferromagnetic teeth extending from the first side and in a first direction parallel to the shaft;
- a second ferromagnetic plate having a first side and a second side and being connected to the second end, the second ferromagnetic plate being centered on the shaft axis, the first and second ferromagnetic plates forming a gap;
- a plurality of permanent magnets having a magnetic field and being coupled to the first side of the second ferromagnetic plate, the magnets extending in a second direction, the second direction being opposite the first direction;
- a first sensing device disposed within the gap for sensing a magnetic flux of the magnetic field; and
- said gap between the first and second ferromagnetic plates including a first portion between said teeth and said magnets, the first sensing device being disposed in a second portion of the gap, said second portion of the gap being disposed radially outward from the first and second ferromagnetic plates.

4. An apparatus for measuring relative displacement between a first end and a second end of a shaft the first and second ends being centered on a shaft axis, comprising:
- a first ferromagnetic plate having a first side and a second side and being connected to the first end, the first ferromagnetic plate being centered on the shaft axis and having a plurality of ferromagnetic teeth extending from the first side and in a first direction parallel to the shaft;
- a second ferromagnetic plate having a first side and a second side and being connected to the second end, the second ferromagnetic plate being centered on the shaft axis, the first and second ferromagnetic plates forming a gap;
- a plurality of permanent magnets having a magnetic field and being coupled to the first side of the second ferromagnetic plate, the magnets extending in a second direction, the second direction being opposite the first direction;
- a first sensing device disposed within the gap for sensing a magnetic flux of the magnetic field; and
- the first ferromagnetic plate including an annular ring disposed radially outward from the plurality of ferromagnetic teeth and radially between the first sensing device and the plurality of ferromagnetic teeth.

5. An apparatus for measuring relative displacement between a first end and a second end of a shaft the first and second ends being centered on a shaft axis, comprising:
- a first ferromagnetic plate having a first side and a second side and being connected to the first end, the first ferromagnetic plate being centered on the shaft axis and having a plurality of ferromagnetic teeth extending from the first side and in a first direction parallel to the shaft;
- a second ferromagnetic plate having a first side and a second side and being connected to the second end, the second ferromagnetic plate being centered on the shaft axis, the first and second ferromagnetic plates forming a gap;
- a plurality of permanent magnets having a magnetic field and being coupled to the first side of the second ferromagnetic plate, the magnets extending in a second direction, the second direction being opposite the first direction;
- a first sensing device disposed within the gap for sensing a magnetic flux of the magnetic field; and
- the second ferromagnetic plate including an area of reduced thickness circumferentially adjacent one or more of the magnets.

6. An apparatus for measuring relative displacement between a first end and a second end of a shaft the first and second ends being centered on a shaft axis, comprising:
- a first ferromagnetic plate having a first side and a second side and being connected to the first end, the first ferromagnetic plate being centered on the shaft axis and having a plurality of ferromagnetic teeth extending from the first side and in a first direction parallel to the shaft;
- a second ferromagnetic plate having a first side and a second side and being connected to the second end, the second ferromagnetic plate being centered on the shaft axis, the first and second ferromagnetic plates forming a gap;
- a plurality of permanent magnets having a magnetic field and being coupled to the first side of the second ferromagnetic plate, the magnets extending in a second direction, the second direction being opposite the first direction;
- a first sensing device disposed within the gap for sensing a magnetic flux of the magnetic field; and
- the second ferromagnetic plate including an area of increased thickness circumferentially between one or more pairs of adjacent magnets.

7. An apparatus for measuring angular displacement about a rotational axis and between a first end and an axially spaced apart second end of a shaft biased rotatably by a torsional force, the apparatus comprising:
- a ferromagnetic tooth spaced radially outward from the rotational axis and engaged rigidly to the first end;
- a permanent magnet spaced radially outward from the rotational axis and engaged rigidly to the second end, and being in a circumferential relationship with the ferromagnetic tooth, the permanent magnet having a magnetic field; and
- a sensing device for sensing a magnetic flux of the magnetic field, the sensing device being disposed axially between the first and second ends and with respect to the rotational axis.

8. The apparatus set forth in claim 7 wherein the sensing device is orientated radially outward from the rotational axis further than the ferromagnetic tooth and the permanent magnet.

9. The apparatus set forth in claim 7 wherein a pole of the permanent magnet is opposed axially to the ferromagnetic tooth.

10. The apparatus set forth in claim 7 wherein the ferromagnetic tooth is not a permanent magnet.

11. The apparatus set forth in claim 7 wherein the ferromagnetic tooth in one of a plurality of ferromagnetic teeth spaced circumferentially apart from one another.

12. The apparatus set forth in claim 7 further comprising a gap defined between the ferromagnetic tooth and the permanent magnet, and wherein the sensor device is located in the gap.

13. The apparatus set forth in claim 12 wherein the permanent magnet is one of a plurality of permanent magnets spaced circumferentially apart from one another.

14. The apparatus set forth in claim 13 wherein each one of the plurality of ferromagnetic teeth are attached ferromagnetically to circumferentially adjacent teeth of the plurality of ferromagnetic teeth.

15. The apparatus set forth in claim 14 wherein each one of the plurality of the plurality of permanent magnets are attached ferromagnetically to circumferentially adjacent permanent magnets of the plurality of permanent magnets.

16. The apparatus set forth in claim 15 further comprising a first plate engaged to the first end and orientated concentrically to the rotational axis, and wherein each one of the plurality of ferromagnetic teeth project axially from the first plate and toward the second end.

17. The apparatus set forth in claim 16 wherein the first plate is made of a ferromagnetic material.

18. The apparatus set forth in claim 16 further comprising a ferromagnetic film adhered to the first plate and the plurality of ferromagnetic teeth.

19. The apparatus set forth in claim 16 further comprising a second plate engaged to the second end and orientated concentrically to the rotational axis, and wherein each one of the plurality of permanent magnets project axially from the second plate and toward the first end.

20. The apparatus set forth in claim 19 wherein the second plate is made of a ferromagnetic material.

21. The apparatus set forth in claim 15 further comprising:
a first ferromagnetic plate engaged to the first end and orientated concentrically to the rotational axis, and wherein each one of the plurality of ferromagnetic teeth project axially from the first ferromagnetic plate and toward the second end; and
a second ferromagnetic plate engaged to the second end and orientated concentrically to the rotational axis, and wherein each one of the plurality of permanent magnets project axially from the second ferromagnetic plate and toward the first end.

22. The apparatus set forth in claim 20 wherein the first and second ferromagnetic plates each have a circular flange projecting axially toward one-another and defining at least in-part the gap.

* * * * *